US010829176B2

(12) United States Patent
Schieffelin

(10) Patent No.: US 10,829,176 B2
(45) Date of Patent: Nov. 10, 2020

(54) EXPANDABLE PANNIERS

(71) Applicant: CIVILIZED CYCLES INCORPORATED, Portland, OR (US)

(72) Inventor: Zachary Schieffelin, Portland, OR (US)

(73) Assignee: CIVILIZED CYCLES INCORPORATED, Portland, OR (US)

(*) Notice: Subject to any disclaimer, the term of this patent is extended or adjusted under 35 U.S.C. 154(b) by 0 days.

(21) Appl. No.: 16/512,228

(22) Filed: Jul. 15, 2019

(65) Prior Publication Data
US 2020/0001940 A1  Jan. 2, 2020

Related U.S. Application Data

(63) Continuation of application No. 16/022,915, filed on Jun. 29, 2018, now Pat. No. 10,351,195.

(51) Int. Cl.
*B62J 9/20* (2020.01)
*B62J 7/04* (2006.01)

(52) U.S. Cl.
CPC .. *B62J 9/20* (2020.02); *B62J 7/04* (2013.01)

(58) Field of Classification Search
CPC ...... B62J 9/00; B62J 9/001; B62J 7/06; B60R 7/043
See application file for complete search history.

(56) References Cited

U.S. PATENT DOCUMENTS

| 299,609 A | 6/1884 | Wood |
| 3,716,938 A | 2/1973 | Ammons |
| 3,786,972 A | 1/1974 | Alley |
| 3,934,770 A * | 1/1976 | Larsen ................. B62J 9/00 224/429 |
| 3,937,374 A * | 2/1976 | Hine, Jr. ............... B62J 9/00 224/430 |
| 4,390,088 A | 6/1983 | Brenner |
| 4,402,439 A | 9/1983 | Brown |
| 4,537,377 A * | 8/1985 | Shewchuk .......... B65B 67/1244 248/99 |
| 4,542,839 A | 9/1985 | Levine et al. |
| 4,577,786 A | 3/1986 | Dowrick et al. |
| 4,580,706 A | 4/1986 | Jackson et al. |
| 4,662,548 A | 5/1987 | Jackson et al. |
| 5,484,090 A | 1/1996 | Lyshkov |
| 5,988,878 A | 11/1999 | Simonett et al. |
| 7,025,236 B1 | 4/2006 | Naujock |
| 8,016,090 B2 | 9/2011 | McCoy et al. |

(Continued)

FOREIGN PATENT DOCUMENTS

| CN | 204077885 U | 1/2015 |
| CN | 204606029 U | 9/2015 |

OTHER PUBLICATIONS

U.S. Receiving Office, International Search Report and Written Opinion of the International Searching Authority, dated Oct. 15, 2019, in PCT/US2019/039046.

*Primary Examiner* — Brian D Nash
(74) *Attorney, Agent, or Firm* — Kolitch Romano LLP

(57) ABSTRACT

Panniers according to the present disclosure may be transitionable between a collapsed configuration and a deployed configuration. Transitioning between the collapsed configuration and the deployed configuration may include unlatching an outboard rigid wall from its position adjacent an inboard rigid wall, such that the pannier automatically springs into the deployed configuration.

16 Claims, 8 Drawing Sheets

(56) References Cited

U.S. PATENT DOCUMENTS

| | | | |
|---|---|---|---|
| 8,272,310 B2 * | 9/2012 | Ingram | B62J 9/001 280/288.4 |
| 8,973,797 B2 | 3/2015 | Langlois | |
| 10,017,222 B2 * | 7/2018 | Carlson | B62J 9/001 |
| 2014/0124558 A1 | 5/2014 | Bowerman | |
| 2014/0138417 A1 * | 5/2014 | Langlois | B62J 9/001 224/419 |
| 2014/0177981 A1 | 6/2014 | Rumbough et al. | |
| 2015/0225032 A1 | 6/2015 | Sakai | |

* cited by examiner

EXPANDABLE PANNIERS

FIELD

This disclosure relates to systems and methods for carrying cargo on a wheeled vehicle. More specifically, the disclosed embodiments relate to panniers for use with bicycles, scooters, mopeds, motorcycles, and the like.

INTRODUCTION

Panniers are cargo containers that are usually mounted in pairs on a beast of burden or a vehicle (e.g., a bicycle or motorcycle). Modern-style bicycle panniers have been in use since the 1970s. Known panniers are often awkward or complicated to use, and have a configuration that creates significant wind resistance regardless of whether contents are enclosed.

SUMMARY

The present disclosure provides systems, apparatuses, and methods relating to expandable panniers.

In some examples, a wheeled vehicle may include a frame; and a pannier coupled to the frame, the pannier comprising: an elongate, collapsible floor having a front end, a rear end, an inboard edge, and an outboard edge; a collapsible front wall coupled to the front end of the floor; a collapsible rear wall coupled to the rear end of the floor; a rigid inboard lateral wall portion fixed to the frame and coupled to the inboard edge of the floor; and a rigid outboard lateral wall portion coupled to the outboard edge of the floor; wherein the pannier is transitionable between a first configuration, in which the outboard lateral wall portion is spaced from the inboard lateral wall portion, such that the pannier defines an internal storage space, and a second configuration, in which the outboard lateral wall portion is secured in a position adjacent the inboard lateral wall portion, such that the front wall, rear wall, and floor are collapsed and encased by the inboard and outboard lateral wall portions.

In some examples, a pannier may include a first lateral wall comprising a first expanse of rigid material; a second lateral wall comprising a second expanse of rigid material; a first end wall extending from the first lateral wall to the second lateral wall and comprising a first plurality of rigid plates having first flexible seams therebetween such that the first end wall is foldable; a second end wall spaced from the first end wall, extending from the first lateral wall to the second lateral wall and comprising a second plurality of rigid plates having second flexible seams therebetween such that the second end wall is foldable; a collapsible floor connecting respective lower portions of the first and second lateral walls and the first and second end walls; wherein the pannier is transitionable between a collapsed configuration, in which the first and second end walls are folded and the first lateral wall is latched in a position adjacent to the second lateral wall, and a second configuration, in which the first and second lateral walls are spaced apart and the first and second end walls are in an unfolded position.

In some examples, a method for carrying cargo on a bicycle may include collapsing a pannier laterally against a frame of a bicycle by urging a rigid outboard wall of the pannier into a position adjacent a rigid inboard wall of the pannier, such that a front wall, a rear wall, and a floor of the pannier are collapsed and compressed between the rigid outboard wall and the rigid inboard wall; applying a biasing force to the outboard wall in an outboard direction as a result of the compression of the front wall and the rear wall; securing the outboard wall of the pannier in the position adjacent the inboard wall of the pannier using one or more latches, such that the biasing force is arrested; causing the pannier to automatically open into a configuration where the outboard wall is spaced apart from the inboard wall by unlatching the outboard wall of the pannier and releasing the compression of the front wall and the rear wall.

Features, functions, and advantages may be achieved independently in various embodiments of the present disclosure, or may be combined in yet other embodiments, further details of which can be seen with reference to the following description and drawings.

DETAILED DESCRIPTION

Figure 1:
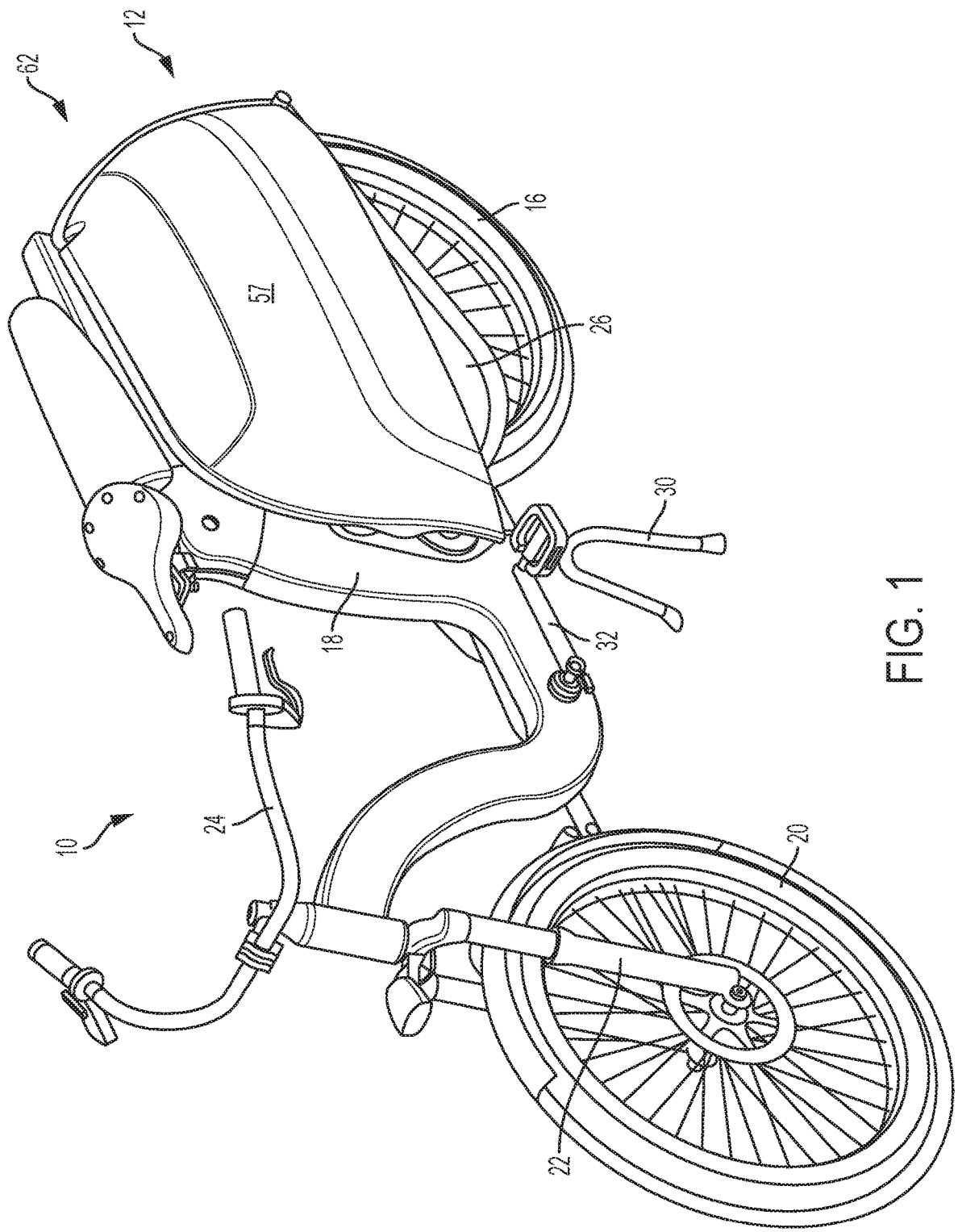
FIG. 1 is an isometric view of an illustrative electric bicycle having expandable panniers in accordance with aspects of the present disclosure.

Various aspects and examples of an expandable pannier, as well as related systems methods, are described below and illustrated in the associated drawings. Unless otherwise specified, an expandable pannier in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A and B, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

The terms "inboard," "outboard," "forward," "rearward," and the like are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "aft" means toward the rear of the vehicle. In the absence of a host vehicle, the same directional terms may be used as if the vehicle were present. For example, even when viewed in isolation, a device may have a "forward" edge, based on the fact that the device would be installed with the edge in question facing in the direction of the front portion of the host vehicle.

"Coupled" means connected, either permanently or releasably, whether directly or indirectly through intervening components.

"Resilient" describes a material or structure configured to be deformed elastically under normal operating loads (e.g., when compressed) and to return to an original shape or position when unloaded.

"Rigid" describes a material or structure configured to be stiff, non-deformable, or substantially lacking in flexibility, under normal operating conditions.

Overview

In general, an expandable pannier in accordance with the present teachings may include a collapsible cargo container having rigid side panels and a foldable floor and walls. In some embodiments, the pannier may be permanently affixed or otherwise incorporated into a bicycle frame, laterally adjacent one of the wheels. The foldable floor and/or walls may be configured to naturally exert an opening force on the rigid side panels, such that unlatching the outer side panel will cause the pannier to spring open in a self-expanding fashion. In some examples, the pannier may be installed on an electric bicycle.

Examples, Components, and Alternatives

The following sections describe selected aspects of exemplary expandable panniers, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Electric Bicycle and Panniers

As shown in FIGS. 1-8, this section describes an illustrative electric bicycle having expandable panniers, although the panniers may be incorporated or installed on any suitable wheeled vehicle. In some examples, the panniers are removable from the vehicle, and therefore transitionable between a portable and an installed mode. The expandable panniers described below are an embodiment of the expandable panniers described in the Overview section, above.

Figure 2:
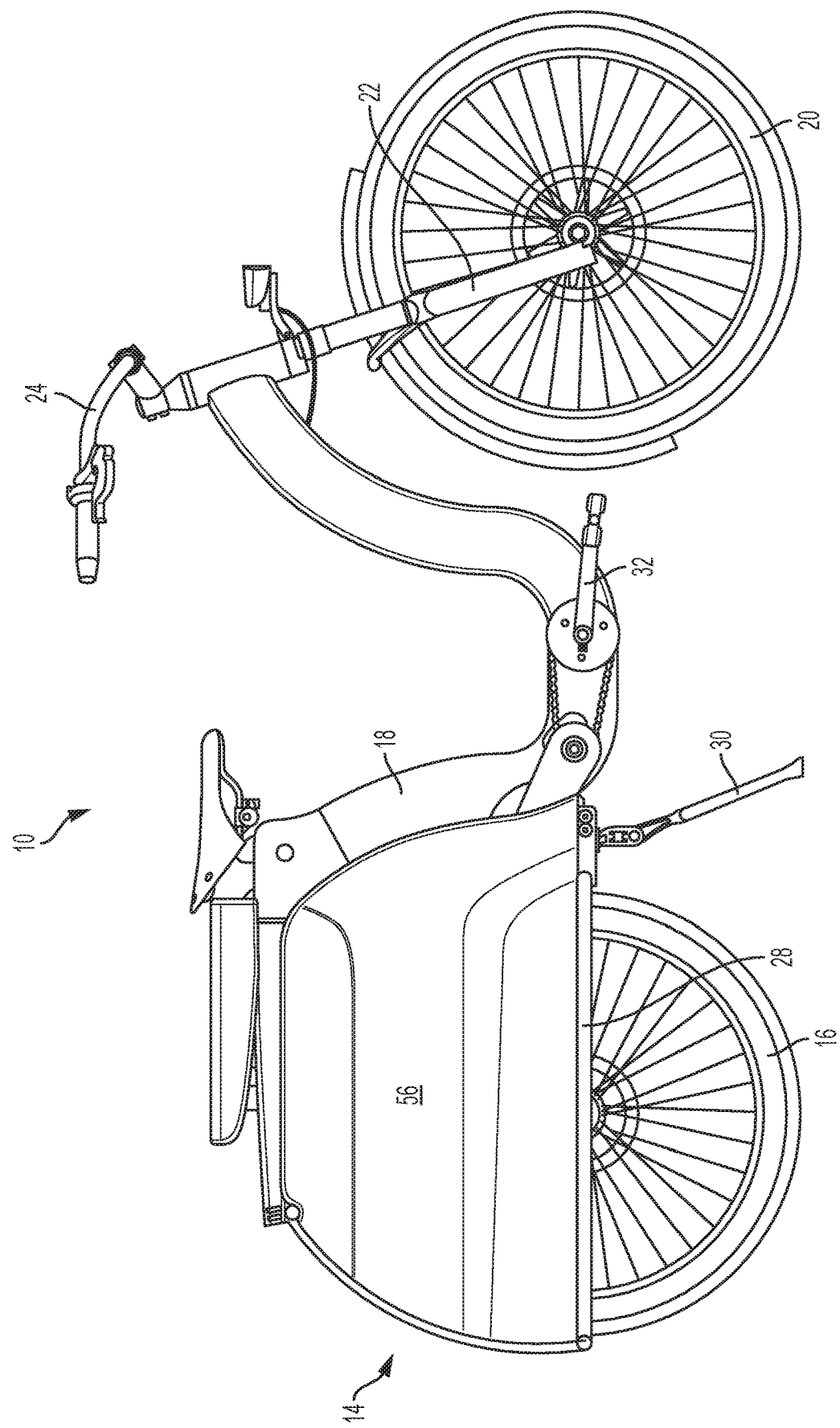
FIG. 2 is a side elevation view of the bicycle of FIG. 1.
Figure 3:
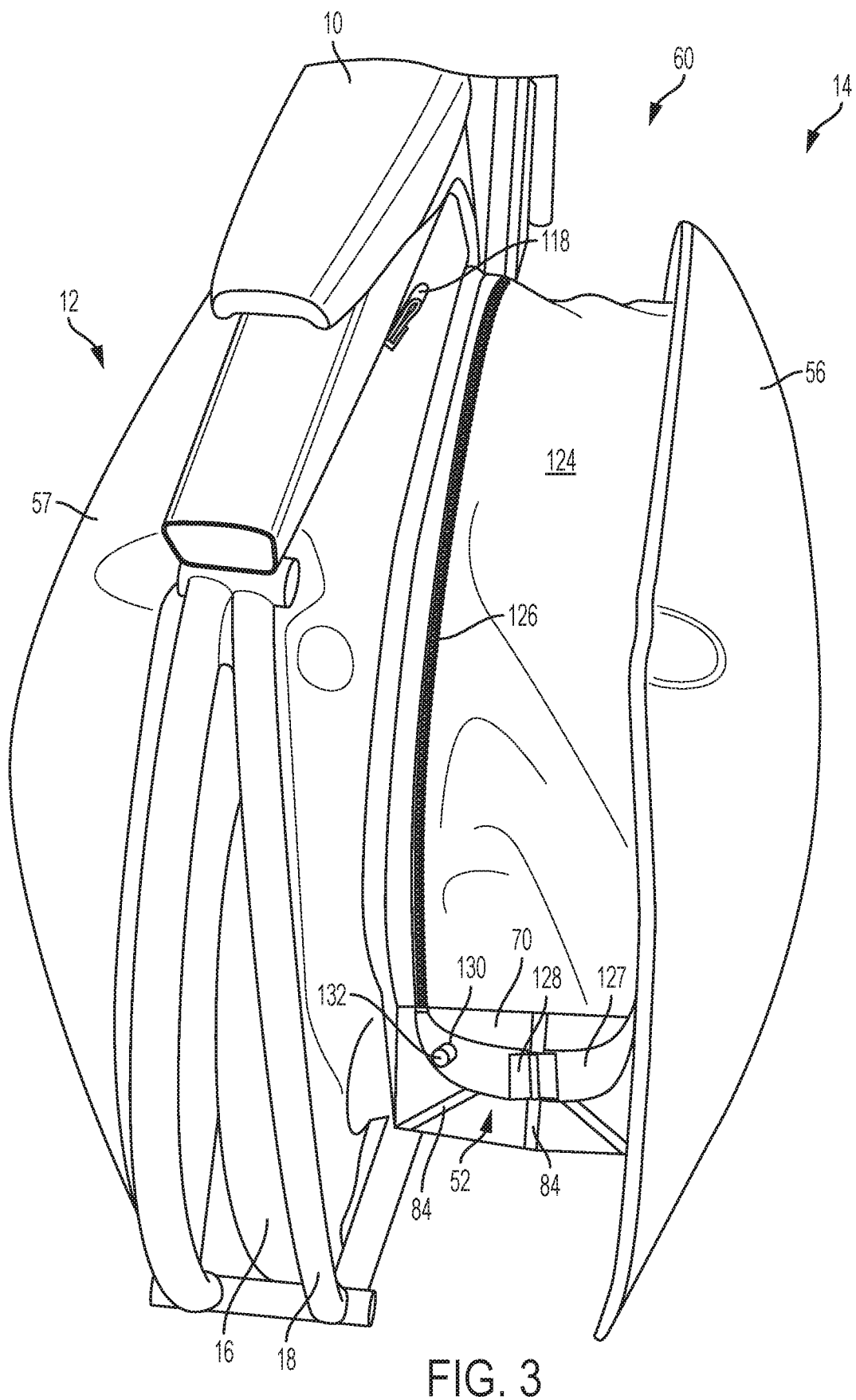
FIG. 3 is a rear oblique view of an illustrative expandable pannier in an expanded configuration, according to the present teachings.
Figure 4:
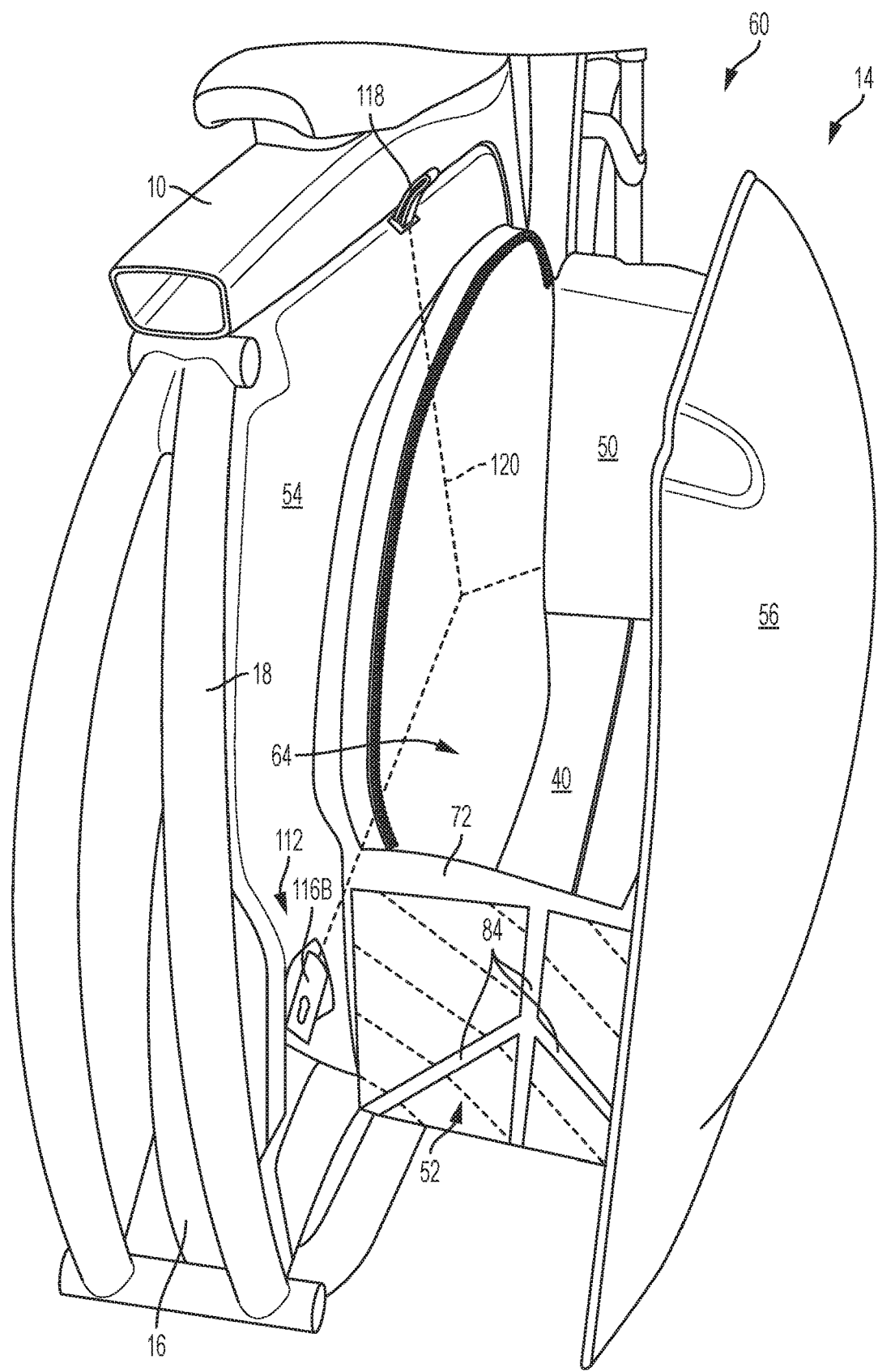
FIG. 4 is a rear oblique view of the pannier of FIG. 3, showing an interior portion.
Figure 5:
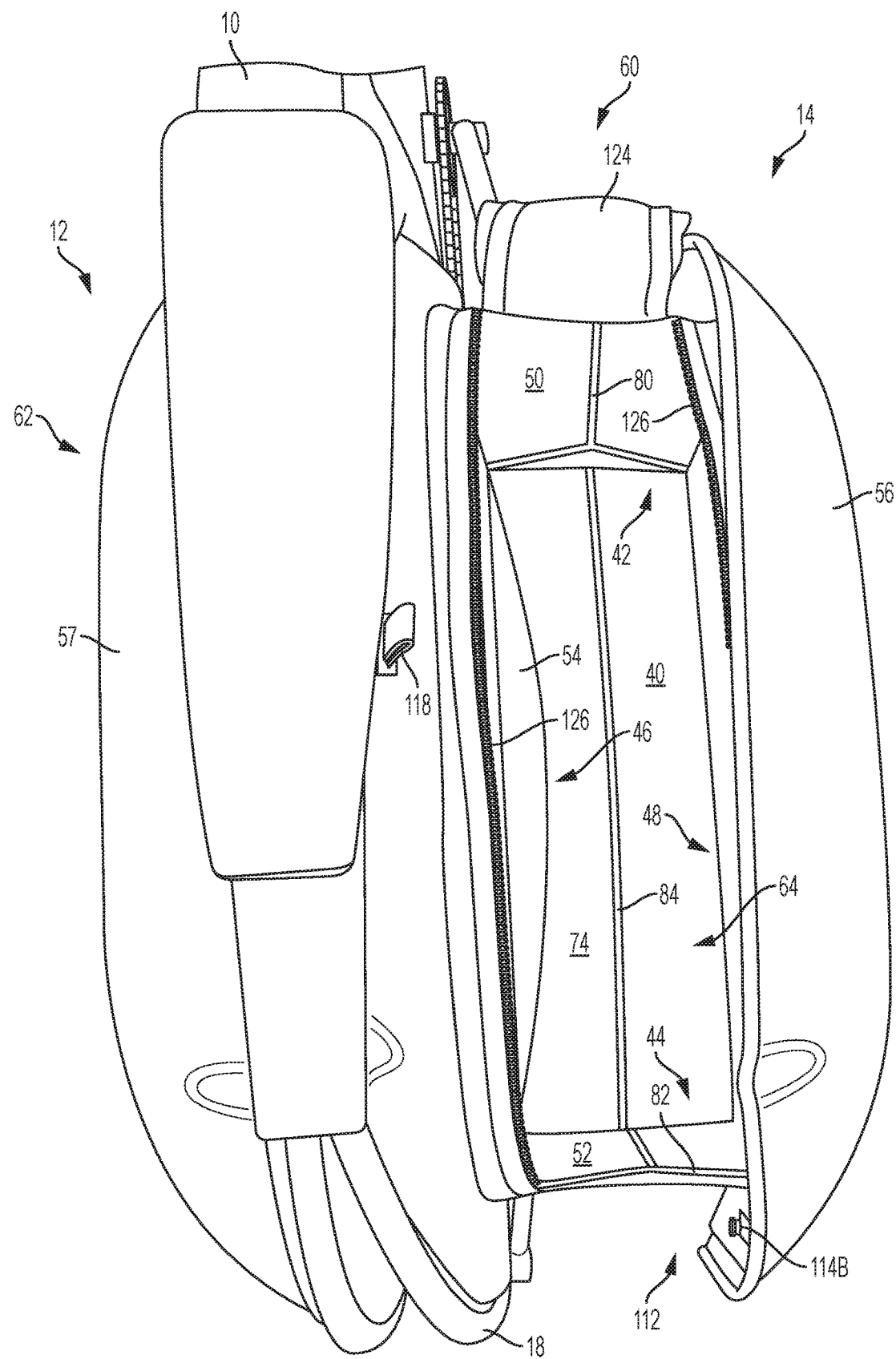
FIG. 5 is top view of the pannier of FIG. 3.
Figure 7:
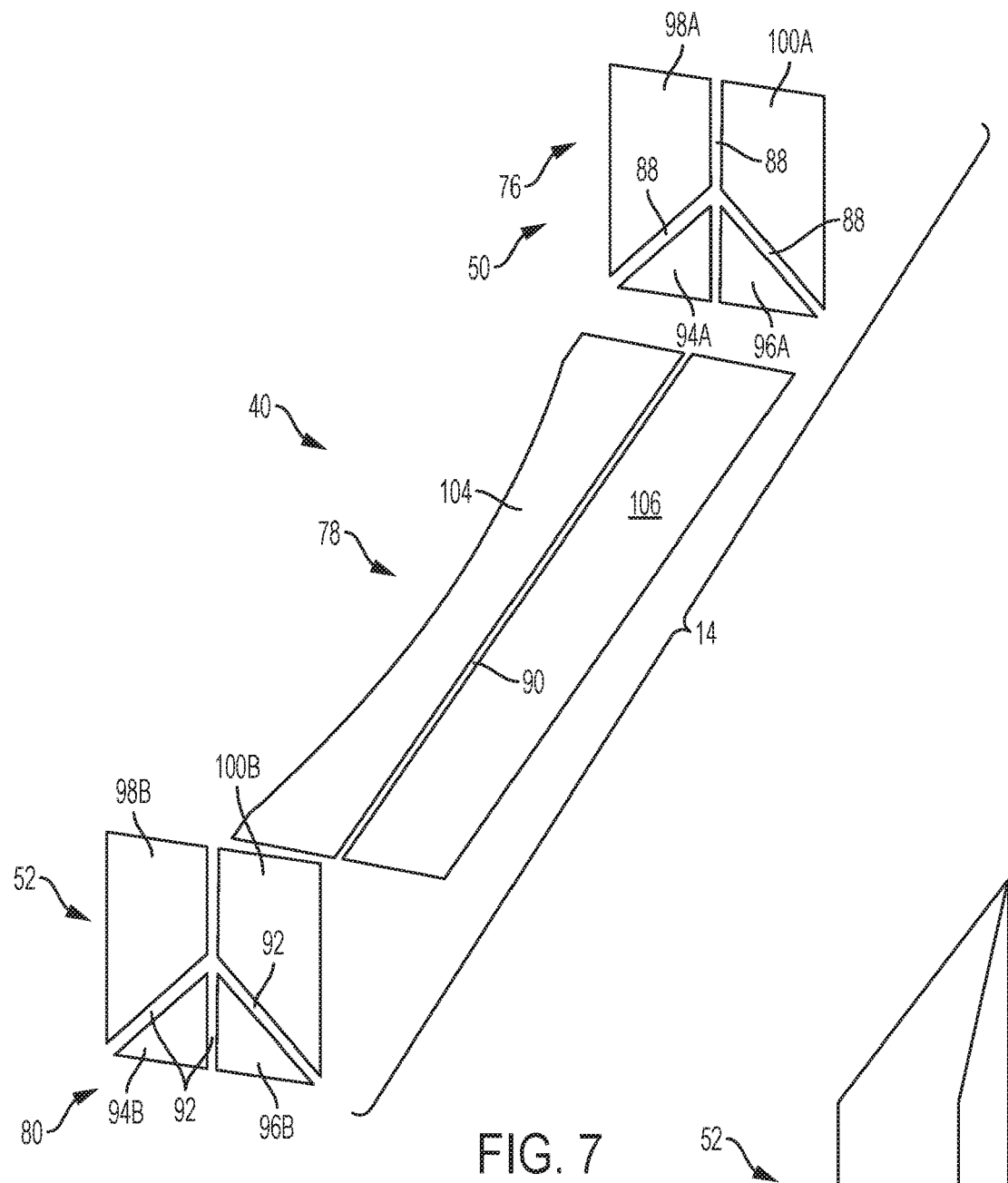
FIG. 7 is an exploded isometric view of selected components of an illustrative pannier as described herein.
Figure 8:
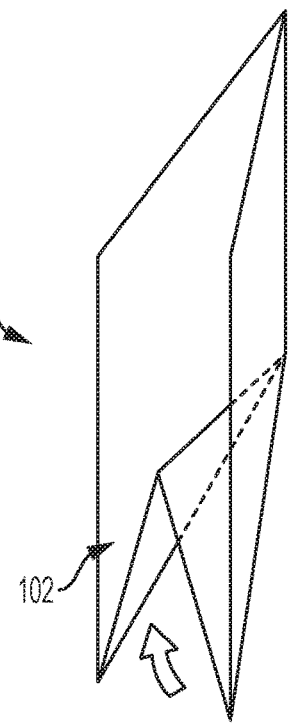
FIG. 8 is a schematic diagram of an end portion of an illustrative pannier in accordance with aspects of the present disclosure, showing a folding topology.

FIGS. 1 and 2 depict an illustrative electric bicycle 10 having a pair of panniers 12, 14 arranged on opposing lateral sides of a rear wheel 16. FIGS. 3-5 are magnified partial views of bicycle 10, showing pannier 14 from various points of view and in various configurations. FIG. 7 is an exploded view showing selected components of a foldable portion of one of the panniers. FIG. 8 is a schematic view depicting how one of the end portions may be configured to fold preferentially in a selected fashion to achieve the functionality described below.

With reference to FIGS. 1 and 2, panniers 12 and 14 are coupled to a frame 18 of electric bicycle 10 adjacent rear wheel 16. Bicycle 10 may comprise any suitable wheeled vehicle, such as a bicycle, tricycle, quadcycle, etc., and may or may not be motorized. In some examples, panniers 12 and 14 may have a large enough capacity as to require a powered vehicle to provide sufficient support for the volume of cargo expected to be carried therein.

In the example depicted in FIGS. 1 and 2, bicycle 10 is a two-wheeled vehicle, with a front wheel 20 rotatably coupled to the frame by a front fork 22. Fork 22 is steerable by way of a handlebar 24. In this example, panniers 12 and 14 are each affixed to frame 18 and supported by a support platform 26, 28. Each platform 26, 28 extends laterally from the frame below the floor of the pannier. Platforms 26 and 28, when present, may comprise footrests or foot supports for a passenger of the vehicle. In some examples, one or both panniers may be selectably or removably securable to the frame. The two panniers are substantially mirror images of each other.

Bicycle 10 further includes a kickstand 30 and a crankset 32 configured to provide manual power to a drive train of the vehicle. In this example, crankset 32 is supplementally or intermittently operable in tandem with an electric drive motor or motors.

Turning to FIGS. 3-6, and with reference to components shown in FIG. 7, pannier 14 includes an elongate, collapsible floor 40 having a front end 42, a rear end 44, an inboard edge 46, and an outboard edge 48. A collapsible front wall 50 (AKA the first end wall) is coupled to the front end of floor 40, and a collapsible rear wall 52 (AKA the second end wall) is coupled to the rear end of floor 40. A rigid inboard lateral wall portion 54 is fixed (e.g., bolted or screwed) or incorporated into frame 18 and coupled to inboard edge 46 of floor 40. A rigid outboard lateral wall portion 56 is coupled to outboard edge 48 of floor 40. Pannier 12 includes substantially similar components, although in a mirrored configuration (e.g., a rigid outboard lateral wall portion 57).

Accordingly, the pannier is transitionable between a first configuration 60 (AKA the deployed or expanded configuration) and a second configuration 62 (AKA the collapsed or secured configuration). In first configuration 60, outboard lateral wall portion 56 is spaced from inboard lateral wall portion 54, such that the pannier defines an internal storage space 64. In second configuration 62, outboard lateral wall portion 56 is secured in a position adjacent inboard lateral wall portion 54, such that front wall 50, rear wall 52, and floor 40 are collapsed and encased by the inboard and outboard lateral wall portions. First configuration 60 provides ease of access to the pannier, while supporting a large storage volume. Second configuration 62 provides a more aerodynamic contour for the vehicle, as well as a more cohesive and attractive appearance when the pannier is not in use.

Front wall 50, rear wall 52, and floor 40 are each configured to be substantially planar when the pannier is in the first configuration, spanning the gap between the inboard and outboard lateral wall portions. The walls and floor may include any suitable components configured to provide a collapsible lower enclosure for internal storage space 64 when in first configuration 60. In some examples, the walls and floor are further configured to provide an outward biasing force when collapsed laterally in second configuration 62. Accordingly, in those examples the pannier is configured to transition from the collapsed second configuration 62 to the deployed first configuration 60 automatically, in response to releasing the outboard lateral wall portion from its position adjacent the inboard lateral wall portion.

In the embodiment depicted in FIGS. 3-8, the front and rear walls and the floor are of a paneled construction. The end walls and floor each comprise a combination of rigid plates with flexible seams between those plates, such that structural support is provided to the pannier by the rigid plates when in first configuration 60. Moreover, the end walls and floor are foldable at the flexible seams, such that the end walls and floor are configured to collapse in a predictable manner.

Specifically, and with particular reference to FIGS. 7-8, front wall 50, rear wall 52, and floor 40 each comprises a respective flexible fabric 70, 72, 74 coupled to a plurality of rigid plates 76, 78, 80, such that flexible seams 82, 84, 86 are formed by the flexible fabric disposed in gaps 88, 90, 92 between the rigid plates. In some examples, the flexible fabric comprises inner and outer fabric layers surrounding (i.e., sandwiching) the rigid plates. The rigid plates may include any suitable flat, rigid material, such as a plastic, heavy-duty cardboard, or metal. The flexible fabric may include any suitable material configured to carry expected loads and repeated folding, such as ruggedized nylon. In some examples, the plates are bonded and sandwiched between layers of fabric. In those examples, the layers of fabric between the plates are bonded to each other to form a flexible double layer. The same construction may be used for the end and bottom panels. In some examples, the end walls include reflective material printed or otherwise incorporated into the paneled parts.

With respect to front wall 50, rigid plates 76 comprise a pair of triangular plates 94A and 96A vertically spaced below a pair of right-trapezoidal plates 98A and 100A, each of the two pairs of plates being mirrored across a vertical seam of flexible seams 82. Similarly, with respect to rear wall 52, rigid plates 78 comprise a pair of triangular plates 94B and 96B vertically spaced below a pair of right-trapezoidal plates 98B and 100B, each of the two pairs of plates being mirrored across a vertical seam of flexible seams 84. Accordingly, as shown in FIG. 8, each of these walls is configured to preferentially form an inside reverse fold 102 when the pannier is in the second configuration. This folding pattern may be defined by a central vertical seam having a pair of angled seams departing generally downward and diagonally therefrom on either side, similar to the central portion of the famous "peace" symbol. In other examples, the folding pattern may be different, based on the selected shapes of the rigid plates. In some examples, the folding pattern may be based on a corresponding origami fold. In some examples, the triangular plates may be disposed above the trapezoidal plates, such that the inside reverse fold is at the upper end of the wall rather than the lower end.

Similarly, with respect to floor 40, rigid plates 80 comprise a pair of rigid plates 104, 106, each extending along the length of floor 40 and defining central gap 92. Inboard rigid plate 104 may have a curvilinear inboard edge, to accommodate a shape of frame 18 and/or inboard wall 54. When collapsed into second configuration 62, floor 40 is configured to preferentially fold upward at seam 86.

The front and rear walls, and in some examples the floor, are further configured such that the fabric layer(s) are tightly bound to the rigid plates and stretched or otherwise tightly arranged across the gaps, such that the flexible seams are biased toward an unfolded position. Said another way, the front and rear walls are configured to have a shape memory, with that shape being a substantially planar configuration. Together with the bulk of the plates and fabric layer(s), this naturally causes the pannier to transition from the collapsed configuration to the deployed configuration upon unlatching. In some examples, this transition is partial, such that manual completion of the transition to the deployed configuration is required.

In some examples, resilient or compliant padding may be included on an inner surface of the walls and floor, to prevent damage to contents stored therein. This may be provided as another layer in the fabric/plate layer topology, or may be a separate layer or liner. In the examples shown in the drawings, rigid outboard lateral wall portions 56 and 57 have a convex shape as viewed from the exterior of the pannier. Accordingly, even when in the collapsed configuration, these panniers will still include some useable amount of internal storage volume.

Figure 6:
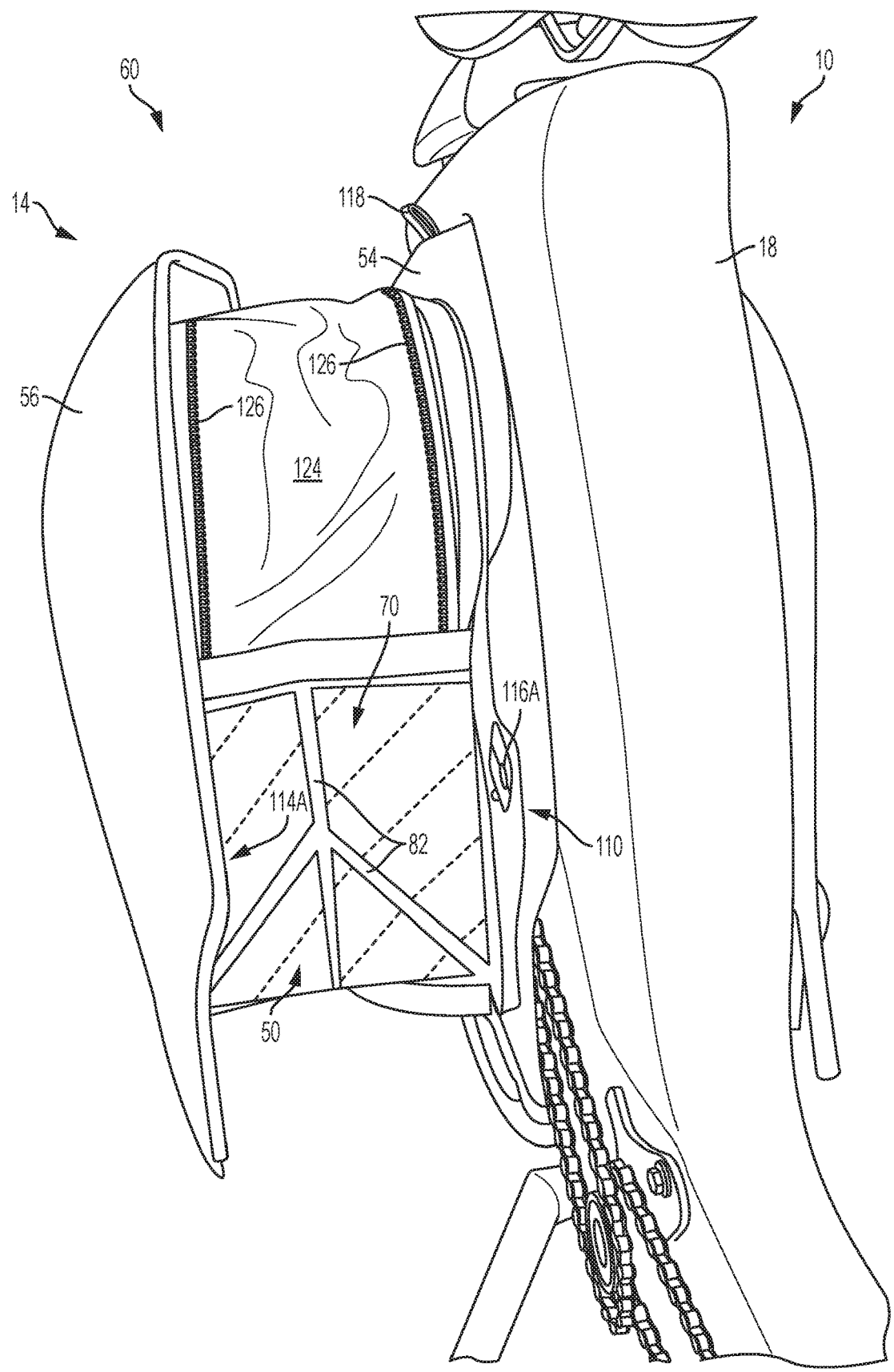
FIG. 6 is a front oblique view of the pannier of FIG. 3.

Pannier 14 further includes one or more latches configured to secure outboard lateral wall portion 56 adjacent inboard lateral wall portion 54. These latches may take any suitable form configured to be releasable manually when the pannier is in second configuration 62. In this example, the latches include a forward latch 110 and an aft latch 112. Each of the latches includes a first latch portion 114A, 114B disposed on the outboard lateral wall portion, which is configured to mate with a second latch portion 116A, 116B disposed on frame 18. In some examples, second latch portions 116A, 116B are disposed on inboard wall portion 54. In this example, each of the latches is a Fidlock® brand magnetic latch having a male and a female portion. The latches are securable by manually inserting the male portion into the female portion, and releasable by retracting a latch member using a manual release tab. As depicted in FIGS. 4-6, latches 110 and 112 are operatively connected to a common manual pull tab 118, externally accessible when the pannier is in the second configuration. Any suitable pull tab or tabs may be utilized. In this example, pull tab 118 is connected to each of the latch portions 116A and 116B by an inverted Y-shaped pull cord 120. Accordingly, manual pull tab 118 is disposed remotely with respect to each of the latches.

Pannier 114 forms a pouch or bag, and has a closeable top portion 124 coupled to the inboard and outboard wall portions and configured to allow selective access to internal storage space 64 (AKA storage volume) of the pannier. Here, top portion 124 is a soft top (e.g., comprising a flexible fabric), closeable using a pair of laterally disposed zippers 126 running along a length of each lateral wall portion. In some examples, a single zipper may be used, or a different fastening mechanism such as snaps, ties, hook-and-loop, and/or the like.

In some examples, zippers 126 may be coupled to a common actuator or handle for simultaneous operation of the zippers, as depicted in the example of FIG. 3. In some examples, the handle may comprise a fabric, string, cord, or other flexible or compliant material. In some examples, the handle may be rigid, e.g., comprising metal or hard plastic. Particularly, in the example depicted in the drawings, zippers 126 are coupled to a handle 127, also referred to as a hasp. Handle 127 comprises a rigid material (e.g., steel, hard plastic, etc.) and has a foldable hinge 128 at its midline, such that the handle is configured to fold and unfold with rear wall 52. Handle 127 may comprise a grommet 130 formed therein and configured to receive a post 132 of rear wall 52. Post 132 may have an aperture therein for receiving a lock or pin, such that handle 127 comprises a hasp configured to be lockable to a corresponding portion of the rear wall of the pannier.

The following series of paragraphs describes additional aspects and features of illustrative expandable panniers. Some or all of these paragraphs may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A wheeled vehicle comprising: a frame; and a pannier coupled to the frame, the pannier comprising: an elongate, collapsible floor having a front end, a rear end, an inboard edge, and an outboard edge; a collapsible front wall coupled to the front end of the floor; a collapsible rear wall coupled to the rear end of the floor; a rigid inboard lateral wall portion fixed to the frame and coupled to the inboard edge of the floor; and a rigid outboard lateral wall portion coupled to the outboard edge of the floor; wherein the pannier is transitionable between a first configuration, in which the outboard lateral wall portion is spaced from the inboard lateral wall portion, such that the pannier defines an internal storage space, and a second configuration, in which the outboard lateral wall portion is secured in a position adjacent the inboard lateral wall portion, such that the front wall, rear wall, and floor are collapsed and encased by the inboard and outboard lateral wall portions.

A1. The wheeled vehicle of paragraph A0, wherein the pannier is configured to transition from the second configuration to the first configuration automatically in response to releasing the outboard lateral wall portion from the position adjacent the inboard lateral wall portion.

A2. The wheeled vehicle of any one of paragraphs A0 through A1, further comprising a support platform extending laterally from the frame below the floor of the pannier.

A3. The wheeled vehicle of any one of paragraphs A0 through A2, wherein the pannier is disposed laterally adjacent a wheel rotatably coupled to the frame.

A4. The wheeled vehicle of any one of paragraphs A0 through A3, wherein the front wall, rear wall, and floor are each substantially planar when the pannier is in the first configuration.

A5. The wheeled vehicle of any one of paragraphs A0 through A4, the collapsible front wall comprising a plurality of rigid plates spaced apart by flexible seams, such that the front wall is foldable at the flexible seams.

A6. The wheeled vehicle of paragraph A5, wherein the front wall comprises a common flexible fabric coupled to the plurality of rigid plates, such that the flexible seams are formed by the flexible fabric disposed in gaps between the rigid plates.

A7. The wheeled vehicle of paragraph A5, wherein the rigid plates comprise a pair of triangular plates vertically spaced from a pair of right-trapezoidal plates, each of the two pairs of plates being mirrored across a vertical flexible seam.

A8. The wheeled vehicle of paragraph A5, wherein the front wall forms an inside reverse fold when the pannier is in the second configuration.

A9. The wheeled vehicle of any one of paragraphs A0 through A8, further comprising one or more latches configured to secure the outboard lateral wall portion adjacent the inboard lateral wall portion.

A10. The wheeled vehicle of paragraph A9, wherein each of the one or more latches comprises a first latch portion disposed on the outboard lateral wall portion configured to mate with a second latch portion disposed on the frame.

A11. The wheeled vehicle of paragraph A9, wherein the one or more latches are operatively connected to a same manual pull tab externally accessible when the pannier is in the second configuration.

A12. The wheeled vehicle of paragraph A11, wherein the manual pull tab is disposed remotely with respect to each of the latches.

A13. The wheeled vehicle of any one of paragraphs A0 through A12, the pannier further comprising a zippered top portion configured to allow selective access to the internal storage space of the pannier.

A14. The wheeled vehicle of paragraph A13, wherein the zippered top portion comprises a hasp coupled to the zipper, the hasp configured to be lockable to a corresponding portion of the rear wall of the pannier.

A15. The wheeled vehicle of any one of paragraphs A0 through A14, wherein the wheeled vehicle is a bicycle.

A16. The wheeled vehicle of paragraph A15, wherein the wheeled vehicle is an electric bicycle.

B0. A pannier comprising:

a first lateral wall comprising a first expanse of rigid material;

a second lateral wall comprising a second expanse of rigid material;

a first longitudinal wall extending from the first lateral wall to the second lateral wall and comprising a first plurality of rigid plates having first flexible seams therebetween such that the first longitudinal wall is foldable;

a second longitudinal wall spaced from the first longitudinal wall, extending from the first lateral wall to the second lateral wall and comprising a second plurality of rigid plates having second flexible seams therebetween such that the second longitudinal wall is foldable;

a collapsible floor connecting respective lower portions of the first and second lateral walls and the first and second longitudinal walls;

wherein the pannier is transitionable between a collapsed configuration, in which the first and second longitudinal walls are folded and the first lateral wall is latched in a position adjacent to the second lateral wall, and a second configuration, in which the first and second lateral walls are spaced apart and the first and second longitudinal walls are in an unfolded position.

B1. The pannier of paragraph B0, wherein the first and second seams are biased toward the unfolded position, such that the pannier is configured to expand automatically when the first lateral wall is unlatched.

B2. The pannier of paragraph B0 or B1, further comprising an upper enclosure spanning upper edges of the longitudinal walls and configured to provide selective access to an internal storage volume of the pannier.

B3. The pannier of paragraph B2, the upper enclosure further comprising a lockable zipper.

B4. The pannier of any one of paragraphs B0 through B3, wherein the first and second lateral walls encase the first and second longitudinal walls and the floor when in the collapsed configuration.

B5. The pannier of any one of paragraphs B0 through B4, wherein the first and second seams are configured such that each of the longitudinal walls preferentially forms an inside reverse fold when in the collapsed configuration.

B. Illustrative Method

Figure 9:
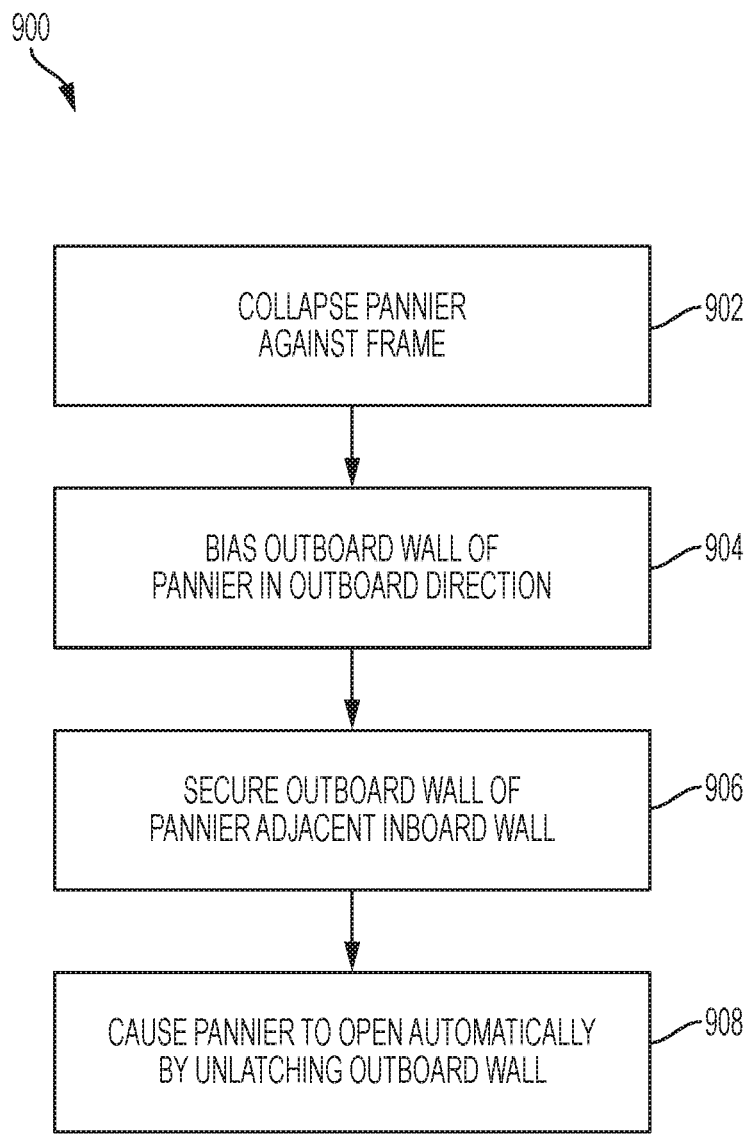
FIG. 9 is a flowchart depicting steps of an illustrative method for carrying cargo on a wheeled vehicle.

This section describes steps of an illustrative method 200 for carrying cargo on a wheeled vehicle (e.g., an electric bicycle); see FIG. 9. Aspects of bicycle 10 and panniers 12 and 14, described above, may be utilized in the method steps described below. Where appropriate, reference may be made to components and systems that may be used in carrying out each step. These references are for illustration, and are not intended to limit the possible ways of carrying out any particular step of the method.

FIG. 9 is a flowchart illustrating steps performed in an illustrative method, and may not recite the complete process or all steps of the method. Although various steps of method 200 are described below and depicted in FIG. 9, the steps need not necessarily all be performed, and in some cases may be performed simultaneously or in a different order than the order shown.

Step 902 of method 900 includes collapsing a pannier laterally against a frame of a bicycle by urging a rigid outboard wall of the pannier into a position adjacent a rigid inboard wall of the pannier, such that a front wall, a rear wall, and a floor of the pannier are collapsed and compressed between the rigid outboard wall and the rigid inboard wall. In some examples, the front wall and the rear wall each include a plurality of rigid plates separated by flexible seams, such that urging the rigid outboard wall of the pannier into the position adjacent the rigid inboard wall of the pannier causes a folding along the respective flexible seams of the front wall and the rear wall. This folding of each of the walls may comprise an inside reverse fold (see FIG. 8), wherein the bottom center of the wall folds upward as the sides of the wall fold toward each other. In this fold, the centerline seam of the wall translates inward (i.e., into the internal storage space). In some examples, a floor of each pannier is supported by a generally planar platform extending laterally from the frame of the bicycle.

Step 904 of method 900 includes causing a biasing force to be applied the outboard wall in an outboard direction as a result of the compression of the front wall and the rear wall.

Step 906 of method 900 includes securing the outboard wall of the pannier in the position adjacent the inboard wall of the pannier using one or more latches, such that the biasing force is arrested. In some examples, the latches are entirely disposed on the pannier. In some examples, one portion of the latch is on the outer wall of the pannier while the other portion of the latch is disposed on the bicycle frame.

Step 908 of method 900 includes causing the pannier to automatically open into a configuration where the outboard wall is spaced apart from the inboard wall by unlatching the outboard wall of the pannier and releasing the compression of the front wall and the rear wall. In some examples, unlatching the outboard wall of the pannier includes pulling a common actuator tab to operate the one or more latches.

In some examples, method 900 may continue with opening a zippered top of the pannier. This opening step may further include unlocking the zippered top of the pannier.

Advantages, Features, and Benefits

The different embodiments and examples of the expandable panniers described herein provide several advantages over known solutions. For example, illustrative embodiments and examples described herein allow the pannier to be collapsed against the vehicle frame when not in use, such that a more aerodynamic profile is achieved and wind resistance is reduced.

Additionally, and among other benefits, illustrative embodiments and examples described herein provide a lockable closure.

Additionally, and among other benefits, illustrative embodiments and examples described herein include a pannier that, even when closed, has a useful storage volume (e.g., enough for a laptop or rain jacket and gloves, etc.). This provides a variable storage volume selectable by the user.

Additionally, and among other benefits, illustrative embodiments and examples described herein expose passenger footrests of the wheeled vehicle when in the collapsed configuration, allowing for comfortable leg placement for a passenger.

Additionally, and among other benefits, illustrative embodiments and examples described herein are configured to spring open upon unlatching of the outboard wall, thereby reducing the amount of effort required to configure the pannier for use.

Additionally, and among other benefits, illustrative embodiments and examples described herein have walls and floors configured to collapse according to a predetermined origami fold, thereby improving repeatability and consistency of operation.

However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A wheeled vehicle comprising:
a frame; and
a pannier coupled to the frame, the pannier comprising:
an elongate, collapsible floor;
a collapsible front wall;
a collapsible rear wall;
a rigid inboard lateral wall portion; and
a rigid outboard lateral wall portion;
wherein the pannier is transitionable between a first configuration, in which the outboard lateral wall portion is spaced from the inboard lateral wall portion, such that the pannier defines an internal storage space, and a second configuration, in which the front wall, rear wall, and floor are collapsed and encased by the inboard and outboard lateral wall portions,
the collapsible rear wall comprising a plurality of rigid plates spaced apart by flexible seams, such that the rear wall is foldable at the flexible seams.

2. The wheeled vehicle of claim 1, wherein the rigid plates comprise a pair of triangular plates vertically spaced from a pair of right-trapezoidal plates, each of the two pairs of plates being mirrored across a vertical flexible seam.

3. The wheeled vehicle of claim 1, wherein the rear wall forms an inside reverse fold when the pannier is in the second configuration.

4. The wheeled vehicle of claim 1, further comprising one or more latches configured to secure the outboard lateral wall portion to the inboard lateral wall portion.

5. A wheeled vehicle comprising:
a frame; and
a pannier attachable to the frame, the pannier comprising:
an elongate, collapsible floor;
a collapsible front wall;
a collapsible rear wall;
a rigid inboard lateral wall portion;
a rigid outboard lateral wall portion; and
a latch configured to secure the outboard lateral wall portion adjacent the inboard lateral wall portion;
wherein the pannier is transitionable between a first configuration, in which the outboard lateral wall portion is spaced from the inboard lateral wall portion, such that the pannier defines an internal storage space, and a second configuration, in which the front wall, rear wall, and floor are collapsed and encased by the inboard and outboard lateral wall portions; and
wherein the latch comprises a first latch portion disposed on the outboard lateral wall portion configured to mate with a second latch portion disposed on the frame.

6. The wheeled vehicle of claim 5, wherein the front wall and the rear wall are configured to provide an outward biasing force when collapsed.

7. The wheeled vehicle of claim 6, wherein the outward biasing force causes the pannier to transition from the second configuration to the first configuration automatically in response to releasing the latch.

8. The wheeled vehicle of claim 5, wherein the pannier is disposed on one lateral side of the vehicle, and further comprising a second substantially identical pannier disposed on an opposite lateral side of the vehicle.

9. The wheeled vehicle of claim 5, wherein the collapsible floor includes a flexible fabric coupled to a pair of rigid plates such that a flexible seam is formed by the flexible fabric of the floor disposed in a gap between the rigid plates of the floor.

10. The wheeled vehicle of claim 9, wherein the collapsible front wall and the collapsible rear wall each include a flexible fabric coupled to a plurality of rigid plates such that flexible seams are formed by the flexible fabric of the respective walls disposed in gaps between the rigid plates of the walls.

11. The wheeled vehicle of claim 5, further comprising a manual pull tab disposed remotely with respect to the latch and configured to release the latch when pulled.

12. The wheeled vehicle of claim 11, wherein the pull tab is externally accessible when the pannier is in the second configuration.

13. A pannier comprising:
a first lateral wall;
a second lateral wall;
a first end wall extending from the first lateral wall to the second lateral wall and comprising a first plurality of rigid plates having first flexible seams therebetween such that the first end wall is foldable; and
a second end wall spaced from the first end wall, extending from the first lateral wall to the second lateral wall and comprising a second plurality of rigid plates having second flexible seams therebetween such that the second end wall is foldable;
wherein the pannier is transitionable between a collapsed configuration, in which the first and second end walls are folded and the first lateral wall is secured in a position adjacent to the second lateral wall, and a second configuration, in which the first and second lateral walls are spaced apart and the first and second end walls are in an unfolded position.

14. The pannier of claim 13, wherein the first and second seams are biased toward the unfolded position, such that the pannier is configured to expand automatically-in response to releasing one or more latches.

15. The pannier of any claim 13, wherein the first and second lateral walls encase the first and second end walls when in the collapsed configuration.

16. The pannier of any one of claim 13, wherein the first and second seams are configured such that each of the end walls preferentially forms an inside reverse fold when in the collapsed configuration.

* * * * *